July 24, 1928.
J. HANSEN
FISHING AND RETRIEVING OTTER
Filed June 30, 1927    2 Sheets-Sheet 1
1,678,593
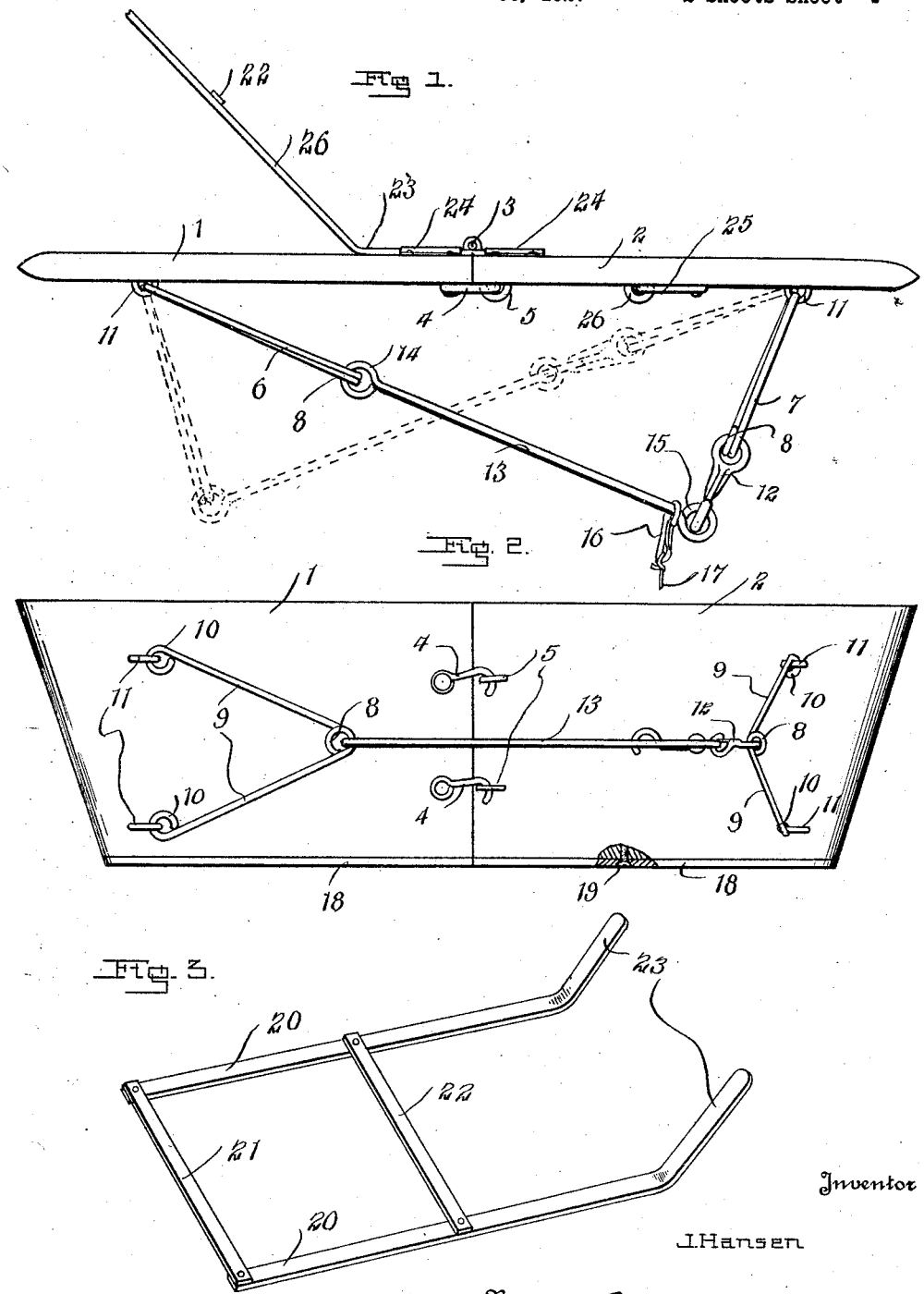

July 24, 1928.
J. HANSEN
FISHING AND RETRIEVING OTTER
Filed June 30, 1927    2 Sheets-Sheet 2
1,678,593
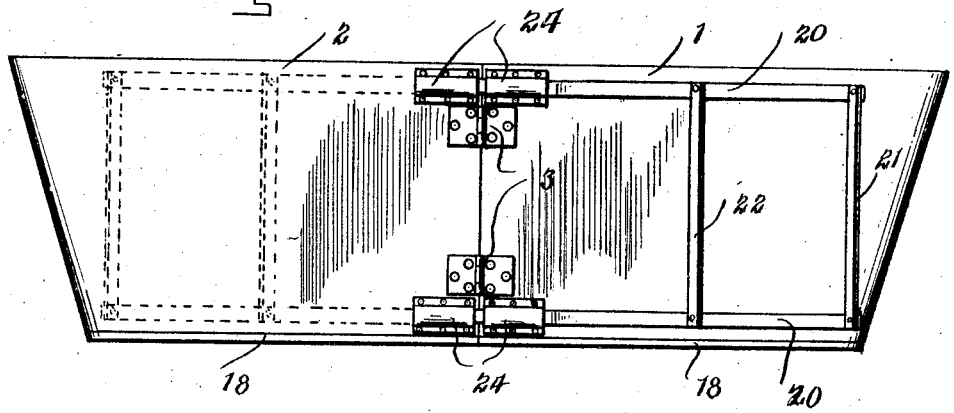
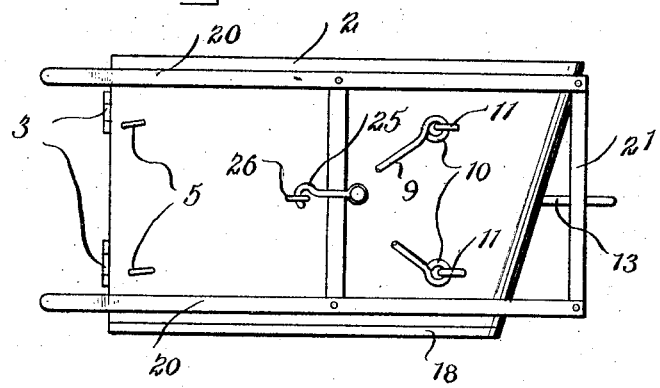
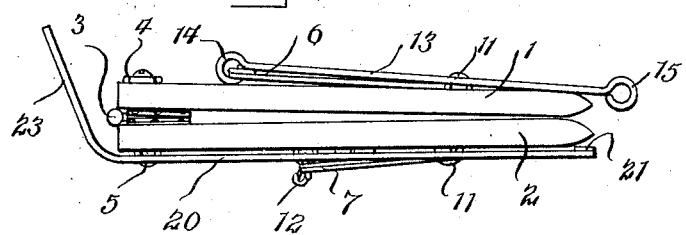
Inventor
J. Hansen
By Lacey & Lacey, Attorneys Patented July 24, 1928.

1,678,593

UNITED STATES PATENT OFFICE.

JOHN HANSEN, OF MILLTOWN, MONTANA.

FISHING AND RETRIEVING OTTER.

Application filed June 30, 1927. Serial No. 202,678.

This invention relates to hunting and fishing and more particularly to an otter which may be employed to carry a fish line having a number of hooks attached thereto outwardly from a sea wall or shore of a body of water or may be employed to retrieve a duck or other bird which has been shot and fallen into the water.

One object of the invention is to provide an otter having a buoyant body which will remain substantially upright in the water and may be very easily caused to move either outwardly in the water or towards the shore.

Another object of the invention is to permit the buoyant body to be folded into a compact mass and a bird-engaging member releasably secured to one section of the body when folded so that the otter may be easily carried or stored in a small space.

Another object of the invention is to so connect the bird-engaging element with the body that it may be securely but releasably held in engagement therewith and when attached to the body constitute means to assist in retaining the sections of the body in an extended operative position.

Another object of the invention is to so form the otter that it may be employed either with or without the bird-engaging member.

The invention is illustrated in the accompanying drawings, wherein

Figure 1 is a top plan view showing the otter ready for use with the bird-engaging member applied thereto;

Fig. 2 is a view showing the improved otter in side elevation;

Fig. 3 is a perspective view of the bird-engaging member;

Fig. 4 is a view similar to Fig. 2 looking at the opposite side of the body with the bird-engaging member applied;

Fig. 5 is a view in side elevation showing the otter folded and the bird-engaging member secured thereto, and Fig. 6 is a top plan view of the folded otter.

The improved otter includes a body portion formed of wood or other buoyant material and this body consists of companion sections 1 and 2 which are connected at their inner ends by hinges 3 and have their outer ends tapered, as shown in Figs. 1 and 2, so that the otter may very easily move through the water either towards or away from the shore. Hooks 4 are carried by the section 1 of the body and are to be engaged with eyes 5 carried by the section 2 so that the two sections may be securely but releasably retained in an extended position for use. It will thus be seen that when not in use the hooks may be released and the body portion folded into a compact mass, as shown in Figs. 5 and 6.

Brackets 6 and 7 are carried by the two sections 1 and 2 at one side of the body and each consists of a strand of strong wire bent intermediate its length to form an eye 8 having arms 9 extending divergently therefrom and terminating in eyes 10 which are loosely engaged in eyes 11 carried by the end section of the body to which it is attached. It should be noted, however, that the bracket 7 is shorter than the bracket 6, as shown in Fig. 1, and this bracket 7 carries a snap hook 12, the eye of which is loosely engaged in the eye 8 of the bracket. A rod 13 extends between the brackets and at one end is formed with an eye 14 loosely engaged in the eye 8 of the bracket 6 and at its other end with a similar eye 15 to be engaged by the hook 12. The rod 13 is to be engaged by a hook 16 carried by a line 17 to which fish hooks may be attached by elongated leaders in the usual manner, and it should be noted that the hook 12 is of such size that when the hook 16 of the line 17 is adjacent the eye 15 the distance between the eye 15 and the adjacent side of the body will be the same as the distance between the eye 14 and the body when the brackets and rod have assumed the position indicated by dotted lines and the hook 16 disposed adjacent the eye 14. By this arrangement the hook 16 may be engaged with the rod 13 and when the brackets and rod are in the position shown in full lines in Fig. 1, the operator may walk along the shore and the body will be retained at such an angle that its forward end will extend diagonally out into the water and will move outwardly from the shore and carry the line with it. Therefore, a number of hooks may be trolled through the water in spaced relation to each other between the otter and the shore. After the operator has walked in one direction for some distance, the line is held tight and the momentum will carry the otter forwardly until the hook 16 has slid along the rod to the eye 14. The brackets and rod will then assume the position indicated by dotted lines and the operator may retrace his movement along the shore. When so doing, the other end of the otter will be pointed outwardly and the otter may be towed in the opposite direction. It will thus be seen that the fish hooks may be trolled in either direction through a lake, river or other body of water and may be drawn toward the shore when so desired. Strips of lead or other metal 18 are secured along the lower edges of the sections 1 and 2 of the body by screws or other suitable fasteners 19 so that the body remains in a substantially upright position when floating in the water.

In order to retrieve ducks or other birds which have been shot and fallen into the water, there has been provided a bird-engaging member shown in Fig. 3. This device is substantially U-shaped and consists of side arms 20 formed of metal strips and connected by cross strips 21 and 22. Additional cross strips 22 may be provided if so desired. Adjacent their free ends the side arms are bent to provide mounting fingers 23 and these fingers are to be received in sockets 24 secured adjacent the inner ends of the end sections 1 and 2 of the body above and below the hinges 3. By referring to Figs. 1 and 4, it will be seen that when the bird-engaging member is attached to the body the fingers extend through the sockets carried by both sections thereof and, therefore, extend across their inner ends in bridging relation thereto and will serve to brace the connected ends of the sections and assist in retaining them in the extended operative position. It will also be noted that the bird-engaging member may extend toward either end of the body. When the device is employed to receive a duck which has fallen into the water, a line free from hooks is connected with the rod 13 and the operator walks along the shore until the otter has moved outwardly a sufficient distance. The operator then retraces his steps and by proper manipulation the duck will be engaged between the bird-engaging member and the body portion of the otter. The otter can then be drawn inwardly and will tow the bird to the shore. A hook 25 and eye 26 are provided upon the section 2 of the body so that when the rod is released from the hook 12 and the hooks 4 released from the eyes 5 the body may be folded, as shown in Figs. 5 and 6, after the bird-engaging member has been detached from the sockets 24, and the bird-engaging member placed against the section 2 of the body and the hook 25 swung over the cross strip 22 into engagement with the eye 26 to retain the bird-engaging member in close contacting engagement with the folded body. The otter can then be easily carried or stored in a small receptacle.

Having thus described the invention, I claim:

1. An otter comprising an elongated buoyant body relatively thin and having its lower portion weighted to cause the body to float in a substantially vertical plane, brackets pivotally connected with said body adjacent its ends and adapted to be swung towards and away from one side of said body, and a rod extending between said brackets and having one end pivotally connected with one of said brackets and its other end releasably and pivotally connected with the other bracket, said rod constituting a member to which an attaching element carried by a line may be engaged and having movement longitudinally thereon.

2. An otter comprising a buoyant body, brackets connected with said body in spaced relation longitudinally thereof and adapted to be swung towards and away from a side of the body, a rod having one end loosely engaged with one bracket, and a fastener to loosely and releasably connect the other end of the rod with the other bracket, said rod constituting an anchoring member to which an attaching element carried by a line may be engaged.

3. An otter comprising a buoyant body, brackets connected with said body in spaced relation longitudinally thereof and adapted to be swung towards and away from a side of the body, one bracket being shorter than the other and each having an eye at its free end, a rod having eyes at its ends, one eye of the rod being loosely engaged in the eye of the longer bracket, and a fastener loosely engaged in the eye of the shorter bracket and adapted to be releasably engaged in the other eye of the rod, said rod constituting an anchoring member to which an attaching element carried by a line may be engaged.

4. An otter comprising a buoyant body, means carried by said body for engagement by a line, and retrieving means extending transversely from the body to engage a floating object and confine the same between the body and retrieving means whereby the object may be retrieved from a body of water.

5. An otter comprising a buoyant body, means for connecting a line with said body, and retrieving means for engaging a floating object carried by said body and having a portion projecting at an incline from one side of the body whereby a floating object may be confined between the retrieving means and body and retrieved.

6. An otter comprising a buoyant body, means for connecting a line with one side of said body, and retrieving means for engaging a floating object releasably connected with the other side of the body and extending longitudinally therewith with a portion projecting at an incline from the body when carried thereby whereby a floating object may be confined between the retrieving means and body and retrieved.

7. An otter comprising a buoyant body, means carried by one side of said body for engagement by a line and adapted to permit adjustment of the line longitudinally of the body, and means projecting from the other side of the body for engaging a floating object to be retrieved.

8. An otter comprising a buoyant body, means carried by one side of said body for engagement by a line and adapted to permit adjustment of the line longitudinally of the body, sockets carried by the other side of the body, and means to engage a floating object having a portion to project diagonally from the last-mentioned side of the body and arms removably engaged in said sockets.

9. An otter comprising a buoyant body, means carried by one side of said body for engagement by a line and adapted to permit adjustment of the line longitudinally of the body, sockets carried by the other side of the body, and means to engage a floating object, said means being substantially U-shaped and having the free ends of its arms removably received in said sockets and intermediate their ends bent to cause the arms to project diagonally from the body.

10. An otter comprising an elongated buoyant body consisting of companion sections having adjacent ends pivotally connected, means to releasably retain said sections in extended end to end relation to each other, arms pivotally connected with said body adjacent its ends and adapted to be swung towards and away from one side thereof, and a rod having one end loosely connected with one arm and its other end loosely and releasably connected with the other arm and constituting a member to which an attaching element carried by a line may be slidably engaged.

11. An otter comprising an elongated buoyant body consisting of companion sections having adjacent ends pivotally connected, means to releasably retain said sections in extended end to end relation to each other, arms pivotally connected with said body adjacent its ends and adapted to be swung towards and away from one side thereof, a rod having one end loosely connected with one arm, and a fastener loosely carried by the other arm and adapted to be loosely and releasably engaged with the other end of said rod.

12. An otter comprising an elongated buoyant body consisting of companion sections having adjacent ends pivotally connected, arms pivotally connected with said sections and adapted to be swung towards and away from one side of said body, a rod extending between and having its ends loosely connetcd with said arms and releasable from one arm and constituting a member to which an attaching element carried by a line may be slidably engaged, sockets carried by the adjacent ends of said sections at the other side of said body from said arms, and a member for engaging a floating object having a portion to extend transversely from the body, and mounting fingers removably received in said sockets and bridging the adjacent ends of the sections to releasably retain the sections in an extended position.

13. An otter comprising an elongated buoyant body consisting of companion sections having adjacent ends pivotally connected, arms pivotally connected with said sections and adapted to be swung towards and away from one side of said body, a rod extending between and having its ends loosely connected with said arms and releasable from one arm and constituting a member to which an attaching element carried by a line may be slidably engaged sockets carried by the adjacent ends of said sections at the other side of said body from said arms, a member for engaging a floating object having a portion to extend transversely from the body, mounting fingers removably received in said sockets and bridging the adjacent ends of the sections to releasably retain the sections in an extended position, and means to releasably hold said member in engagement with one body section when the body is folded.

In testimony whereof I affix my signature.

JOHN HANSEN. [L. S.]